(12) United States Patent
Mangione et al.

(10) Patent No.: US 11,459,083 B2
(45) Date of Patent: Oct. 4, 2022

(54) DEFORMING FOIL STRUCTURE FOR BRIDGING CURVED FLUID-DYNAMIC SURFACE

(71) Applicant: National Research Council of Canada, Ottawa (CA)

(72) Inventors: Jaye Mangione, Ottawa (CA); Amin Fereidooni, Ottawa (CA); Yong Chen, Ottawa (CA); Viresh Wickramasinghe, Ottawa (CA); Jan Marchwica, Greely (CA)

(73) Assignee: National Research Council of Canada, Ottawa (CA)

( * ) Notice: Subject to any disclaimer, the term of this patent is extended or adjusted under 35 U.S.C. 154(b) by 147 days.

(21) Appl. No.: 16/920,597

(22) Filed: Jul. 3, 2020

(65) Prior Publication Data

US 2021/0001972 A1  Jan. 7, 2021

(30) Foreign Application Priority Data

Jul. 3, 2019 (CA) .................................. CA 3048431

(51) Int. Cl.
*B64C 3/48* (2006.01)
*B64C 3/44* (2006.01)

(52) U.S. Cl.
CPC .......... *B64C 3/48* (2013.01); *B64C 2003/445* (2013.01); *B64C 2201/102* (2013.01)

(58) Field of Classification Search
CPC ................ B64C 3/48; B64C 2003/445; B64C 2003/543; B64C 2201/102
See application file for complete search history.

(56) References Cited

U.S. PATENT DOCUMENTS 2,222,935 A   11/1940   Chilton
3,179,357 A    4/1965   Lyon
(Continued)

FOREIGN PATENT DOCUMENTS

EP   1047593 B1   11/2006
EP   2423104 A1    2/2012
(Continued)

OTHER PUBLICATIONS

Barbarino, S. Gandi, F., Design of Extendable Chord Sections for Morphing Helicopter Rotor Blades, Article in Journal of Intelligent Materials Systems and Structures, Proceeding of ASME 2010 Conference on Smart Materials, Adaptive Structures and Intelligent Systems, Sep. 28-Oct. 1, 2010, pp. 1-14, Aug. 2011.
(Continued)

*Primary Examiner* — Rodney A Bonnette
(74) *Attorney, Agent, or Firm* — Jason E. J. Davis (57) ABSTRACT

A bridging structure for a deforming foil, such as a morphing wing, that provides a fluid-dynamic surface throughout foil deformation that forms a curved fluid-dynamic surface with a relatively low drag. A high extent of foil deformation can be provided, with lower actuation force, providing a fluid-dynamic surface with a simple or complex curve in one direction, by providing a set of rail-mounted members that are joined at one end to a deforming sheet. By coupling the members with high elongation, resilient bodies, adjacent members can support each other, while permitting extension, and accommodating curvature.

20 Claims, 4 Drawing Sheets

(56) References Cited

U.S. PATENT DOCUMENTS

| | | | |
|---|---|---|---|
| 3,716,209 A * | 2/1973 | Pierce | B64C 3/48 |
| | | | 244/123.1 |
| 3,941,334 A | 3/1976 | Cole | |
| 4,285,482 A | 8/1981 | Lewis | |
| 4,429,844 A * | 2/1984 | Brown | B64C 3/48 |
| | | | 244/219 |
| 5,158,252 A | 10/1992 | Sakurai | |
| 5,367,970 A | 11/1994 | Beauchamp et al. | |
| 6,371,415 B1 | 4/2002 | Lorkowski et al. | |
| 7,530,533 B2 | 5/2009 | Perez-Sanchez | |
| 7,931,240 B2 | 4/2011 | Kothera et al. | |
| 8,256,719 B2 | 9/2012 | Wood et al. | |
| 8,366,057 B2 | 2/2013 | Vos et al. | |
| 8,534,611 B1 * | 9/2013 | Pitt | B64C 3/50 |
| | | | 244/214 |
| 8,925,870 B1 | 1/2015 | Gordon et al. | |
| 9,598,167 B2 | 3/2017 | Grip et al. | |
| 2006/0145030 A1 | 7/2006 | Cowan et al. | |
| 2008/0035788 A1 * | 2/2008 | Kothera | B63B 1/248 |
| | | | 244/99.8 |
| 2011/0114791 A1 * | 5/2011 | Henry | B64C 3/38 |
| | | | 244/123.6 |
| 2015/0210379 A1 | 7/2015 | Henning et al. | |

FOREIGN PATENT DOCUMENTS

| | | |
|---|---|---|
| GB | 1296994 A | 11/1972 |
| WO | 2015190124 A1 | 12/2015 |
| WO | 2016046787 A1 | 3/2016 |
| WO | 2018209434 A1 | 11/2018 |

OTHER PUBLICATIONS

Dayyani, I, Friswell M.I., Ziaei-Rad, S., Saavedra Flores, E.I. Equivalent Models of Composite Corrugated Cores with Elastomeric Coatings for Morphing Structures, Composite Structures 104 (2013) 281-292.

Fereidooni, A., Marchwica, J., Leung, N., Mangione, J., Wickramasinghe, V., Development of a Hybrid (Rigit-Flexible) Morphing Leading Edge Equipped with Bending and Extending Capabilities, Journal, Reprints and permission: sagepub.co.uk/journalsPermissions.nav 2019. 1-13.

Kintscher, M., Wiedemann, Monner, H.P., Keintze, O., Kuhn, T. Design of a smart leading edge device for low speed wind tunnel tests in the European project SADE, Institue of Composite Structures and Adaptive Systems, German Aerospace Center, DLR, Braunschweig, Germany, vol. 2 No. 4, 2011, 383-405.

Kota, S., Flick, P., Collier, F., Flight Testing of the FlexFloil, Adaptive Compliant Trailing Edge, AIAASciTech Forum, 54th AIAA Aerospace Sciences Meeting, 2016, 1-13.

Olympio, K. R., Gandhi, F., Flexible Skins for Morphing Aircraft Using Cellular Honeycomb Cores., Journal of Intelligent Material Systems and Structues, vol. 21—Nov. 2010, 1719-1735.

Qing, Al, Jawahar, H. K., Azarpeyvand, M. , Ilario Da Silva, C. R., Experimental and Numerical Studies of Flow and Noise Control of Aerofoils Using Morphing Structures, Conference Paper, Oct. 2016.

Shen, Y., Ang, H.S., Liu, W D., Trapezoidal cellular support structure applied to flexible telescopic Sandwich skin of morphing wing, Acta Materiae Compositae Sinica, 2015, 32(3): 815-822 (available JP only—Abstract in English).

Thill, C., Etches, J. A. , Bond, I.P., Potter, K.D., Weaver, P.M., Composite Corrugated Structures for Morphing Wing Skin Applications, Smart Materials and Structures, 19 124009; 2010, pp. 10.

Yokozeki, T., Takeda, S., Ogasawara, T., Ishikawa, T., ScienceDirect, Composites Part A: applied science and manufacturing, 37, (2006) 1578-1586.

Jacobs, E.N., , Airfoil Section Characteristics as Affected by Protuberanances, Report No. 446; Report National Advisory Committee for Aeronautics; 109-124, Pub Date Jul. 11, 1932.

Shmilovich, A, Yadlin, Y., Pitera, D. M., Wing Leading Edge Concepts for Noise Reduction, The Boeing Company, 27th International Congress of the Aeronautical Sciences, ICAS 2010.

Fereidooni, Amin, Marchwica, Jan, Leung, Natalie, Mangione, Jaye, Wickramasinghe, Viresh; Development of a hybrid(rigid-flexible) morphing leading edge equipped with bending and extending capabilities; Journal of Intelligent Material Systems and Structures, Research Articl, Sep. 12, 2020; pp. 1-9.

\* cited by examiner

DEFORMING FOIL STRUCTURE FOR BRIDGING CURVED FLUID-DYNAMIC SURFACE

CROSS-REFERENCE TO RELATED APPLICATIONS

This application claims the benefit of Canadian Patent Application Serial No. 3,048,431 filed Jul. 3, 2019.

FIELD OF THE INVENTION

The present invention relates in general to a bridging structure for a deforming foil, that provides a fluid-dynamic surface throughout foil deformation; and in particular to an articulated bridging structure that is extendable to fill gaps between separated foil segments producing the fluid-dynamic surface with variable curvature in one direction.

BACKGROUND OF THE INVENTION

Noise generated through aeroacoustics is a known problem with commercial aviation. The noise is unfortunately greatest when it is least welcome: on landing and take-off. This is because of leading and trailing edge structures that are required to be extended to generate higher lift during lower velocity flight. These leading and trailing edge structures conventionally are "slotted", which is to say that an open space extends between the leading and trailing edge structures and a main body of the wing. While it is relatively convenient to make structures like this, the space between the structures allows for turbulent flow around the edge structures, which is responsible for substantial noise [S. Gudmundsson, General Aviation Aircraft Design: Applied Methods and Procedures, Oxford: Butterworth-Heinemann, 2014.]. Noise regulations can limit an aircraft's available approach paths and takeoff/landing hours [A. Shmilovich, Y. Yadlin and D. M. Pitera, "Wing Leading Edge Concepts for Noise Reduction," in 27th International Congress of the Aeronautical Sciences, Nice, 2010.]. Furthermore, as noted by Gudmunsson, slotted structures increase drag, which impedes take-off performance of aircraft. Experimental testing has shown that morphing wings can be used to increase lift without increasing drag [S. Kota, "Flight Testing of the FlexFoil Adaptive Compliant Trailing Edge," in 54th A/AA Aerospace Sciences Meeting, San Diego, 2016.].

With a recent proliferation of unmanned vehicles that have lower regulatory requirements, and a need for low drag and quiet operation, a wider range of deforming foils are called for.

While aircraft structure is a primary target of the present invention, Applicant notes that fluid-dynamic (aerodynamic and hydrodynamic) foils used for power generation, or flow management or conditioning can also benefit of chord and camber variations, to vary lift and drag. In many cases systems benefit of both extension along a curved path (e.g. extending both chord and camber) to adapt to flow conditions, and it is desirable to increase, or at least not appreciably decrease, a length of extension as well as to provide a fluid-dynamic surface that is curved in one direction.

To date, several morphing wings (a term for deforming aerodynamic foils) have been proposed, designed and tested. Many morphing wings are incapable of extending both in camber and chord. Unfortunately both camber and chord extension are highly desirable for producing a high lift and low drag pose. For example, EP1,047,593 to Kota shows a mechanical structure that is actuated by a set of compliant linkage elements, which look like webs interconnecting a deformable surface and an actuation mechanism. These designs have yet to produce foils that are capable of substantial deformation. The surface area of the morphing wings are nearly the same in both states of deformation shown, and as a result, limited affect on lift and drag are expected.

Morphing wings need to have a stiffness to resist aerodynamic loads, while being compliant enough to produce the desired deformation. This is a difficult trade-off, and it results in the need for higher power pneumatic, hydraulic or electric actuation, which tends to increase costs, power demand, footprint, and weight relative to slotted edge structures, as well as severely limiting deformation extent. Nonetheless, morphing wings have the proven advantage of distributing deformation continuously across surfaces, which permits design of desirable (smooth and seamless) wing surface profiles at all deformation states, resulting in lower noise and drag.

Applicant has uncovered an antique disclosure of a patent by Donald Pierce (GB 1296994, filed Jun. 2, 1969) which includes a FIG. 5, that visually suggests, a morphing wing that is shown able to extend in chamber and chord. According to this patent: "It will often be necessary, especially where large amplitude profile variation is required, for the said part of the wall or skin not to be contiguous with the remainder of the wall or skin, but for its extremity to over- or underlie part of the said remainder and be in sliding relationship therewith." While the leading edge structure illustrated is said to comprise a rigid internal structure, and a "swinging frame 72" is identified, there is very little explanation of how the "part of the skin or wall" is mounted for movement. FIG. 5 is therefore troublesome as it is not clear how the schematically illustrated, smoothly curved aerodynamic surfaces would or could be provided and supported, particularly if (as is required) the structure is supported under variable aerodynamic loads in all states of deployment (poses). The leading edge profiles schematically shown in FIG. 5 only feature the tip, which allows the draftsperson to avoid showing an area of high curvature at a top side, which simplifies the problem for the viewer, but not for one trying to replicate this disclosure. If each section of the skin or wall is mounted at both ends to deform in order to produce the wing profiles shown, it is not clear how they can also slide over each other to achieve the extension and contraction. As there is no detail offered of the skin or wall, there is no clear demarcation of any hard vs. soft part of the morphing wing.

Articulated structures are known for bridging linear spans between foil segments designed for relative displacement. For example, Applicant's co-pending WO 2018/209434 teaches a novel skin with oriented nanotubes and an unfolding or inflating support structure. The unfolding or inflating support structure is similar to other "accordion" structures defined by a set of members running span-wise, where each adjacent member is coupled by resilient webs. The webs are adapted for large extension elastic deformation to separate the members in the span-wise direction, to accommodate deformation, while supporting the members regardless of the extension state. Another example is in a paper entitled "Design of Extendable Chord Sections for Morphing Helicopter Rotor Blades" to Barbarino et al. (Proceedings of the ASME 2010 Conference on Smart Materials, Adaptive Structures and Intelligent Systems/Article in Journal of Intelligent Material Systems and Structures, August 2011). The morphing cellular structure/accordion-like structure illustrated is adapted for only planar extension.

Thus the prior art fails to address a highly extensible bridging structure that allows for forming a curved fluid-dynamic surface, and particularly one that allows for variation in extensible bridging structure curvature that depends on a degree of extension, or a bridging structure with low resistance to extension, able to take fluid-dynamic load.

SUMMARY OF THE INVENTION

As far as known, the only deforming foils available to date are limited to linear (planar) actuation and incapable of adopting a desired aerodynamic curvature, or require skins that are independently stiff enough to resist fluid-dynamic load in use. At the very least, novel bridging structures that allows for design of higher curvature, and higher variability curvature, fluid-dynamic surfaces, are needed. Applicant has demonstrated a bridging structure for deforming foils that can be lighter weight, and use lower power articulation, or have higher extension, while resisting fluid-dynamic loads with a desired curved foil profile.

In accordance with an aspect of the present invention, a bridging structure is provided. The bridging structure includes:
a deformable sheet having an elastic elongation in a flexed direction of at least 5% of a length of the sheet in the flexed direction; a thickness having an elastic elongation less than $\frac{1}{5}^{th}$ that of the flexed direction; and a second sheet direction perpendicular to the flexed direction;
an array of members running in a first direction, each member having: a top surface bonded to the deformable sheet with the top surface running in the second sheet direction; a pair of facing sidewalls, each sidewall facing a sidewall of an adjacent member, except for outward facing sidewalls of end members; a bottom surface opposite the top surface; and two end surfaces;
a set of resilient bodies interconnecting the facing sidewalls to couple the members and stiffen the bridging structure in the flexed direction, while allowing for extension of the bridging structure by changing a spacing of the members in the flexed direction;
at least two couplings on each of the members; and
at least two curved guide rails running substantially perpendicular to the members, the couplings jointed to the curved guide rails by translational joints, wherein the members sliding along the guide rails undergo at least a 5° revolution about an axis in the second sheet direction during translation along the guide rail.

The resilient bodies may be leaf springs, coil or helical springs, or paired opposing springs having different rest separations. The resilient bodies may be webs, rods or wires composed of a same, similar or different material as the members, and may be monolithically joined by welding, fusion, adhesive or by extrusion, or may be joined mechanically. For mechanical joining, the resilient body may extend through a slit or opening in the members on a first facing sidewall, and couple to an end of an adjacent resilient body extending through a like slit or opening in the member of a second facing sidewall; or the resilient bodies may be coupled to the facing members at opposite ends. The webs, rods or wires may define a torturous serpentine path between pairs of facing sidewalls, such as a sinusoidal curve, or a composite of sinusoidal curves, may be non-symmetric, symmetric or antisymmetric, and may have a symmetric collection of zero crossings, such as a sinc curve. The webs, rods or wires may have a uniform thickness and width, or may have curvature, thickness, and width variations to produce a desired resilient force at each position of actuation, a desired longevity, and weight (critical for flight control surfaces but not all foils). An advantage of a web in the form of a ribbon is an increased stiffness of the member coupling relative to an equal thickness rod or wire, and a greater load distribution across the sidewalls, with simple manufacture. An advantage of a rod or wire is an ability to increase the extension range of the resilient body in a compact form, by bending the rod or wire in two degrees of freedom, and a wider variety of arrays of the rods/wires for engineered coupling stiffnesses of the members. While the resilient body may, for manufacturability, have curvature limited to a single plane, in some embodiments the resilient bodies may have a uniform or varying torsion. For example, even a ribbon of considerable width can have a uniformly spiraling path between the members; or a ribbon with a thickness running length-wise of the member at joining, may undergo a 90° twist near the edges such that for the remainder of the ribbon (intermediate the twists) only a ribbon thickness is presented in an orthogonal projection from the top surface of the members. This latter example may be provided at each alternate web with thicknesses and widths in this view. Furthermore, the slits or openings may alternate from length-wise to width-wise in adjacent members. Particularly each member may comprise an alternating sequence of length-wise and transverse slits, and adjacent members may have corresponding opposite or matching slits. Each resilient body may therefore have a same torsion, or a torsion that matches up to 180°. If the resilient body is a web or rod, it may have thickened edges, for tailored stiffness maps, and if a web, may have a longitudinal fold, thinning, or bend to increase stiffness.

The at least two couplings on each member are adapted for mounting the members to the curved guide rails. Each coupling may be a revolute joint on a slider retained by the guide rail, in which case a moment of the member is free within the coupling, and a pivoting of the member about the revolute joint is constrained by tension of the sheet, and elasticity of the resilient body. If so, each coupling need not be revolute, or revolute to the same range of actuation. For example, the couplings of any members that do not substantially pivot about the coupling may have lower degree of freedom, or range of actuation, joints, which may simplify construction, reduce parts counts, improve stiffness, increase longevity, or allow for a lighter bridging structure. Alternatively the coupling may be as a non-revolute joint to a slider that is oriented by the guide rail. If so, the slider contributes a drive to pivot the member by advancing over the guide rail. Either way a net variation in pivot orientation of the member during traversal of the guide rail, is more than 5°, more preferably 10-120°, more preferably from 15-100°, and more preferably 20-90°. This local and (linked by resilient bodies, but to some degree) independent pivoting movement allows for a varying curvature of the aerodynamic surface, which is not possible with low-stiffness, articulated bridging structures known in the art. Most aerodynamic surfaces (in the subsonic flow regime) feature relatively smooth, gradual curvatures, and these are ideal for smoothly pulling articulated bridging structures.

The purpose of the bridging structure is to produce a curved fluid-dynamic suction or pressure surface extending between two rigid segments of a fluid-dynamic surface, such as a foil. One of the segments can be an edge segment, being a leading or trailing edge segment of the foil. Either segment may or may not itself be an articulated, segmented or deforming segment of the foil, as long as a local part of the segments being joined is suitably rigid. The curved rail may, in principle, be affixed to only one of the edge and second segments, such as the second segment, but can be mounted at both ends to both segments, via an actuable linkage for allowing the motion of the edge segment with respect to the second segment. The curved rail may be extensible, like a single or multi-stage (in-line or parallel) drawer slider common in drawer hardware, and may further provide for a pivoting of a stage of the slider at one point in the actuation.

The rigid segments and bridging structure define at least one of a suction surface and a pressure surface for a foil. The rigid segments are preferably actuated by an actuator that is separate from the bridging structure, although the actuator may be built into, or share a stiffness support with the guide rails. The actuator preferably controls the motion of the rigid segments, and the bridging structure follows as a generally passive structure, with the elasticity provided by the resilience of the system being a lower order force. This lower order force, however, ensures that the members and resilient bodies move as a coordinated unit between relatively expanded and compact poses while prevent excessive pivoting of the members.

An actuable linkage couples the edge segment to the second segment. The linkage is actuable to displace the edge and second segments between a closed pose, where the edge and second segments are adjacent, and an open pose where edge and second segments are separated (at least mostly in the flexed direction). At the open and closed poses, and throughout the motion between, the bridging structure provides a smooth, continuous fluid-dynamic surface. The actuator may be designed to produce a single uninterrupted motion from the closed to the open pose, may have a number of actuation schemes used depending on fluid-dynamic conditions, may have a number of staged poses at which it is designed to remain for different fluid-dynamic effect, and may be designed as a servo-controlled system with flight control and flight response feedback to occupy any state of extension, in use. While the surface may be flat throughout some part of the motion, for example, before a leading edge of the bridging structure meets a first curve of the curved rail, at least in the open pose, the surface is curved.

In accordance with an aspect of the present invention, a deforming foil is provided. The deforming foil has a rigid first foil segment with a fluid-dynamic curvature on an outer face defining part of a foil surface on an articulated part of the deforming foil; a rigid second foil segment providing a suction surface and a pressure surface for the deforming foil, that is mounted rigidly to a structure; a linkage coupling the first segment to the second segment, the linkage actuable to displace the first segment relative to the second segment between a closed pose, where the first and second segments are adjacent, and an open pose where first and second members are separated; and a bridging structure extensible during linkage actuation to provide a curved fluid dynamic suction or pressure surface extending between the second and first segments continuous with foil surfaces of the first and second segments in all states of actuation between the closed and open poses. The bridging structure has: a deformable sheet having an elastic elongation in a deforming direction at least as great as extension of the bridging structure as required in the open pose; an array of at least four members running in a longitudinal direction, each member having: a top surface bonded to the elastomeric sheet in a direction perpendicular to the deforming direction; a pair of facing side-walls, each side-wall facing a sidewall of an adjacent member, except for outward facing side-walls of end members; a bottom surface opposite the top surface; and two ends; a set of resilient bodies interconnecting adjacent members, the resilient bodies adapted to extend a spacing of the members in the deforming direction to increase an extent of the bridging structure in the flexed direction by at least 5% more than a closed pose of the bridging structure; a curved guide rail running perpendicular to the members; and a mounting mechanism for each member, coupling the member to the guide rail, the coupling permitting an angular pivot of at least 5° about an axis in the span direction during translation along the guide rail, for at least mounting mechanisms of members that cross a curved part of the guide rail.

A copy of the claims is incorporated herein by reference. Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 1a,b are cross-section side elevation views of a fluid-dynamic foil with a camber and chord varying leading edge extension with suction and pressure articulated bridging structures, respectively in closed and open poses, and FIGS. 1c,d are side elevation and top plan partial views of the bridging structure;

FIGS. 6a-d are partial side elevation views of four variants of the bridging structure that can be used alternatively to that of FIG. 1c, respectively showing an embodiment where, compared to that of FIG. 1c: couplings to the guide rail are distal the sheet; the resilient bodies and couplings are both distal the sheet; the resilient bodies are distal the sheet; and where the couplings are more proximal the sheet, but the resilient bodies are oriented webs running longitudinally of the members;

DESCRIPTION OF PREFERRED EMBODIMENTS

Herein an articulated bridging structure is provided that allows fluid dynamic foils to deform without introducing slots or breaks in the deforming fluid-dynamic surfaces, and particularly to foils with curved deforming fluid-dynamic surfaces, with more extension and less resistance while stiff enough to resist fluid dynamic pressures on the surface.

Figures 1A, 1C, 1D:
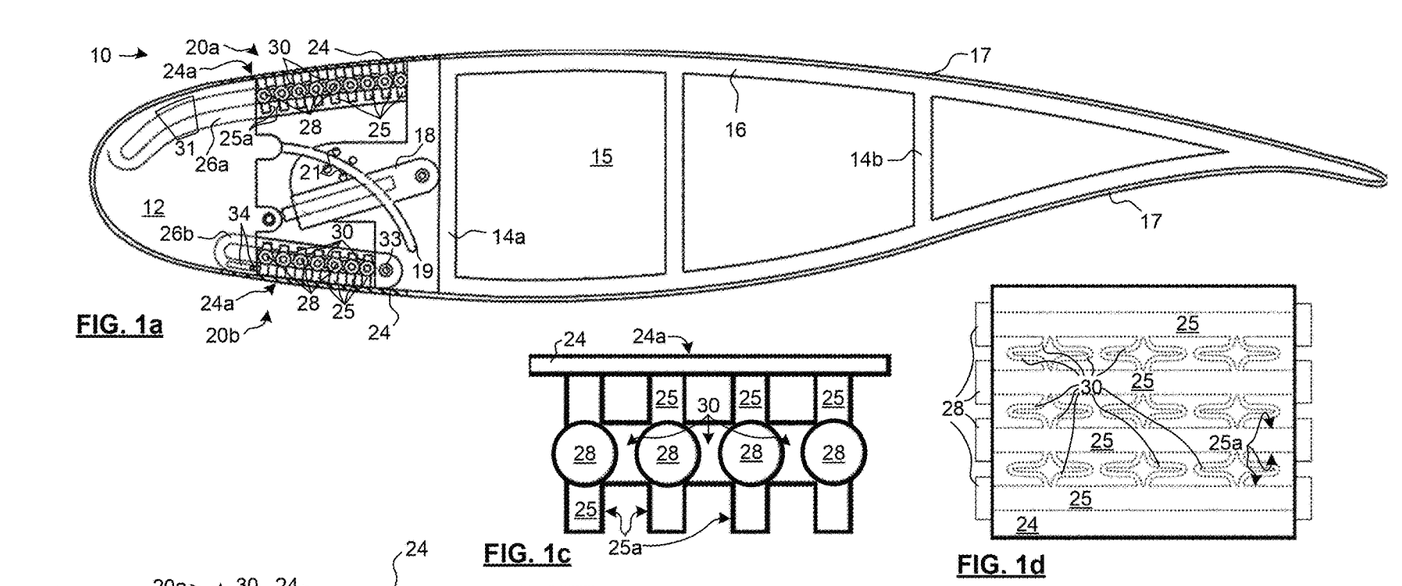
Figure 1B:
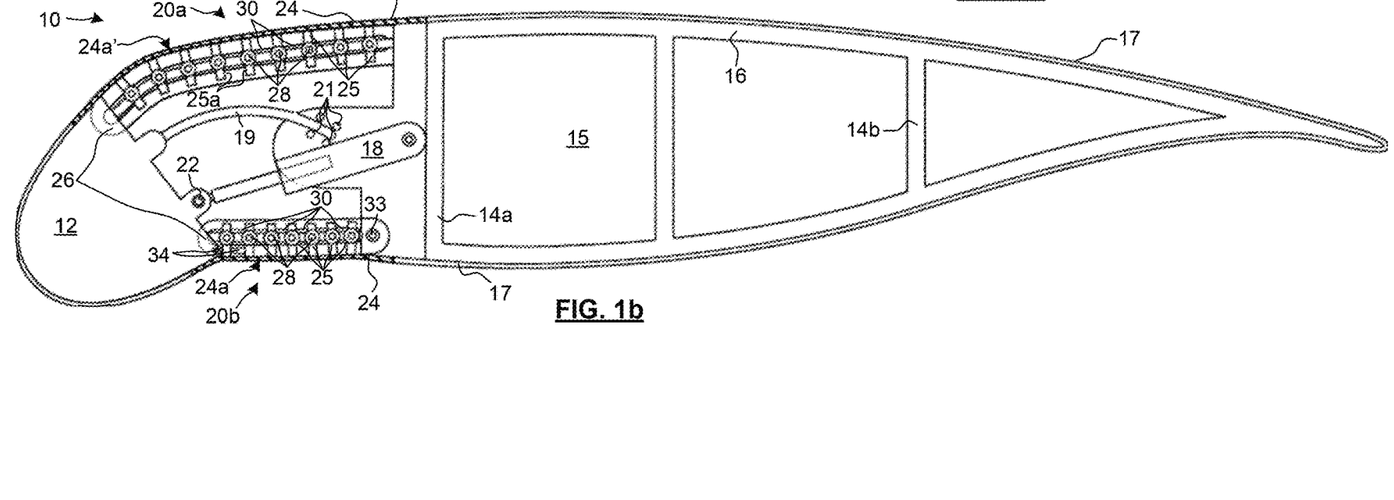

FIGS. 1a,b schematically illustrate a cross-sectional side elevation view of a foil 10 having a leading edge extension. The view is normal to a span direction of the foil 10, and shows a conventional cambered foil such as might be used in a wing of an aircraft, or on a propeller blade, although other fluid-dynamic surfaces for variable lift and drag can be similarly provisioned.

FIG. 1a shows the foil 10 in a closed pose, conducive to low drag interaction with a fluid stream, and FIG. 1b shows the foil 10 in an open pose, conducive to a high lift. The high lift pose has an increased camber, increased chord length, and an attendant change of angle of attack.

The foil 10 is formed of two rigid segments, a leading edge segment (LES) 12 and a foil body 15. The body 15 has a conventional array of spars 14a,b, ribs 16, longerons and stringers (not in view) covered by a skin 17. As is well known in the art, wing design is a very important structure that has a complex engineered response to loads. In the present context, when it is stated that the segments are "rigid", it is intended to include all the expected flexural response of a conventional wing with a skin supported against fluid-dynamic loads at fixed locations, unlike a bridging structure designed to support a skin at varying locations, depending on a pose or state of extension of the deforming foil.

LES 12 provides a rigid nose for the foil 10, that is mounted to the body 15 by an actuator linkage including, as shown, a piston 18 and glide arm 19 with roller supports 21. The piston 18 controls the separation of the LES 12 from body 15. One end of the piston 18 is affixed to a leading spar 14a (or other suitable hard point) of the body 15, and the other end of the piston 18 is mounted by revolute joint 22 to the LES 12. Similarly roller supports 21 of the glide mechanism are grounded to the leading spar 14a, and the glide arm 19 is rigidly affixed to the LES 12. An advantage of using a rigid nose segment is that a position of the deforming foil 10 where pressures, and pressure differences, are highest.

The deforming foil 10 has two bridging structures 20, one on a suction side (SBS 20a), and one on a pressure side (PBS 20b). Herein 'suction side' and 'pressure side' are understood to refer to opposite sides of a foil in use. At each moment, a foil in use has several fluid dynamic forces on it, including, typically, lift, which is oriented perpendicular to flow and span. Most foils are instantly recognized as having a pressure and suction side for their intended use, even if pressure is not uniform on both sides in many flow conditions. Mean pressures on the pressure and suction sides are different such that the suction side has a lower pressure than the pressure side, even if some of the pressure side may have lower pressure than ambient, and some of the suction side may have higher pressure than ambient. Lift is provided in a direction that passes from the pressure side to the suction side. Foils generate lift only in certain flow conditions and accordingly these must be assumed to identify a side as pressure or suction. A foil may be designed to reverse suction and pressure surfaces during changing operating conditions and thereby flip SBS and PBS. The foil may even be symmetric having no preferred sides until actuated. Such foils are particularly of interest in submarine devices, and for flow control or energy harvesting from marine or aeolian flows.

Each bridging structure 20 includes a deformable sheet 24 (shown as cross-hatched for contrast in FIGS. 1a.b), supported by members 25 (only a few of the nine identified for ease of illustration) that are mounted for sliding on guide rails 26 via couplings 28 (only a few identified). Resilient bodies 30 extend between the members 25 to couple the members 25. FIGS. 1c,d schematically illustrate an enlarged partial view (only 4 members shown) of the bridging structure 20, without the guide rails 26. FIG. 1c is in side elevation view, matching those of FIGS. 1a,b, whereas FIG. 1d is a top plan view, with the members 25 and resilient bodies 30, shown in ghost view. FIGS. 6a-d illustrate 4 alternative embodiments thereof.

The members 25 are arranged so that they are all parallel, running in a direction perpendicular to a direction in which the bridging structure deforms (in every state of extension). Each member has: a top surface affixed to the deformable sheet (in view in FIG. 1d); a pair of sidewalls (each sidewall facing a sidewall of an adjacent member, except for outward facing sidewalls of edge members); a bottom surface opposite the top surface; and two end surfaces (in view in FIG. 1c). Herein the top surface and sidewalls extend the length of the member, the sidewalls and ends extend a width of the member, and the top surface and ends extend a thickness of the member.

At every pose of the deforming foil 10, the array of members 25 run in a direction generally perpendicular to the flexed direction of the sheet 24. The members 25 shown are generally beams of uniform cross-section, with rectangular ends that are in view in FIGS. 1a,b,c, though members with non-uniform cross-section, or different cross sections such as I-beams, T-beams, etc. could be used alternatively. Top surfaces of the beams are affixed to back sides of the sheet 24, which are opposite fluid-dynamic surfaces 24a of the sheets 24. The size and shape of the top surfaces, and particularly the width thereof, are important engineered parameters. The wider the top surface that meets the sheet 24: the higher a surface area for bonding the sheet 24 and the member 25; the more pronounced a ridge structure is provided in use by a tilting of the members 25 about an axis of the couplings 28 (which is important for providing a smooth supported area of the curved fluid-dynamic surface intermediate the bands of unsupported elastomeric material); and the smaller the fraction of the sheet 24 is available for contributing to the elongation. If a wide top surface is provided, it at least stiffens the sheet 24 locally, and leads to an articulated, curved fluid-dynamic surface in the flexed direction that consists of elastomeric segments that are in tension between edges of these stiffened regions, which may be better for lower degree of extension, and lower curvature bridging structures, or segments thereof. Accordingly, the top edges may be minimized (e.g. having a bullnose or taper), to the extent that a remaining edge provides adequate adhesion to the sheet.

The members 25 have a stiffness and separation (in each pose) required for supporting the sheet 24 against fluid dynamic forces, to avoid deformations that would undesirably affect drag of the foil. As the members 25 are further separated, the tension in the sheet 24 takes on an increasing role in resisting deformation. For aerodynamic foils, the spacings between the members at each pose determines a length of unsupported sheet, and the tension of the sheet. These length and tension values can be used with suitable aerodynamic models to determine local normal forces on the sheet, and the resulting deflection. Jacobs' rule [Report National Advisory Committee for Aeronautics report No. 446 entitled Airfoil section characteristics as affected by protuberances by Eastman N. Jacobs] can then be used to evaluate the design. According to Jacob's rule the spacing between the members 25 are chosen such that the deflection of the sheet 24 in the normal direction, at the points intermediate the supports, due to aerodynamic loads does not exceed 0.001c, where c is the chord length.

The beams are shown with couplings 28 in their middle in FIG. 1a,b,c,d. As such the guide rails 26 are located at a recessed depth below the sheet, which is a structural feature that differentiates over some prior art accordion-type structures, such as Barbarino et al., which is incapable of producing a curved fluid-dynamic surface as the resilient members would stick out of the plane where the accordion-type structure curves. By providing the resilient members well below the sheet 24, the sheet may deform on a curved trajectory without hitting the resilient members, and imparting a corrugated pattern through the sheet. Furthermore, a change in pivot angle about the axis of coupling 28 gives rise to a change in extent of the deformation of the sheet. Unlike the extension of the couplings 28 which affect separation or spacings of the couplings equal with deformation extent of the sheet 24, a small pivot angle change results in a change in the deformation extent that depends on a radial separation of the sheet from the axis, and can be relatively large. While this requires greater force to accomplish, and may result in non-linear actuator force demand and require higher stiffness members 25 subject to higher pivot angles, it can be efficient. It is thus possible to produce larger variations of the motion of the sheet 24 with smaller variations in motion of the couplings 28, allowing the guide rails 26 to define a simpler, smoother arcuate path than that of the sheet.

The sheet 24 and member 25 may be chemically bonded, stitched, pinned or mechanically fastened to the sheet. Alternatively, the sheet 24 and the member 25 may be monolithically formed with a same material, particularly if the member is stiffened by inserts that embue the member 25 with desired stiffness. Typically the member is stiffer than the sheet 24, at least in comparison with elasticity in the flexed direction. The sheet and member may be joined, for example by over-moulding. As such, the interface between the stiffening part of the sheet 24 and member 25 can be distributed across much of the member 25, instead of being limited to the top surface. Moreover, 3D printers with elastomeric and thermoplastic nozzles can form the sheet 24, member 25 and resilient bodies 30 in a single process.

The resilient bodies are corrugated elastically deformable ribbons that provide large range motion between the members, preferentially in a direction that spaces the members. In the illustrated embodiment, the ribbons extend perpendicular to the facing sidewalls 25a. As shown in the side view, the ribbons are aligned with the couplings 28 around the middle of the facing sidewalls. The bridging structure 20 is shown in a collapsed pose. An extended pose may provide 1.2 to 20 times this spacing.

The resilient bodies 30 preferably have a high linear extension, as with a web, ribbon, rod or wire traversing a serpentine path between facing sidewalls 25a of beside members 25, and a reproducible restorative force throughout extension (which may be less than linear with separation of the sidewalls 25a). The serpentine path may be a sinusoidal curve, or a composite of sinusoidal curves, may be non-symmetric, symmetric or antisymmetric, and may have a symmetric collection of zero crossings, such as a truncated sinc curve shown in FIG. 1d. The resilient bodies may be webs, ribbons, rods or wires composed of similar or different material as the members, and may be monolithically joined by welding, fusion, adhesive or by extrusion, or may be joined mechanically. For mechanical joining, the resilient body may extend through a slit or opening in the members on a first facing sidewall, and couple to an end of an adjacent resilient body extending through a like slit or opening in the member of a second facing sidewall; or the resilient bodies may be coupled to the facing members at opposite ends. The resilient bodies may be leaf springs, coil or helical springs of metal or resilient plastic.

The webs, rods or wires may have a uniform thickness and width, or may have curvature, thickness, and width variations to produce a desired resilient force at each position of actuation, a desired longevity, and weight (critical for flight control surfaces but not all foils). An advantage of a web in the form of a ribbon is an increased stiffness of the member coupling relative to an equal thickness rod or wire, and a greater load distribution across the sidewalls, with simple manufacture, in particular in one sheering direction. An advantage of a rod or wire is an ability to increase the extension range of the resilient body in a compact form, by bending the rod or wire in two degrees of freedom (curvature and torsion), and a wider variety of arrays of the rods/wires that allows for engineered coupling stiffnesses of the members. An advantage of resilient bodies in the form of a rod, ribbon or web is provided in how it can be conveniently mount to the members 25. For example, by extending the resilient body through a slit or opening in the member 25 sized to minimally decrease stiffness of the member 25 while providing a mounting that is non-revolute about an axis of the ribbon.

While the resilient body may, for ease of manufacture, have curvature limited to a single plane, in some embodiments the resilient bodies may have a uniform or varying torsion. For example, even a ribbon of considerable width can have a uniformly spiraling path between the members; or a ribbon with a width running length-wise of the member at facing surface 25a, may undergo 90° twists near the facing surfaces such that for the remainder of the ribbon (intermediate the twists) is perpendicular to its ends. A uniform spiral, with suitable planar bends, can allow for highly torturous paths, for substantial extension, and good low force resilience at every point of extension (sufficient to guide retraction despite any changing fluid dynamic loads) while minimally resisting the actuator linkage. Ribbons with only a single 90° (or other angle) twist between beside members 25 may also be provided, and the ribbon itself may extend through multiple members 25 at different angles between the longitudinal and width directions of the members. The ribbons may be anchored by a root to the facing surface that provides more material at the root and a higher stiffness tensor.

Furthermore, the slits or openings through which a ribbon passes may alternate, running lengthwise through one member, and width-wise through the adjacent member. Particularly each member may comprise an alternating sequence of length-wise and transverse slits, and adjacent members may have corresponding opposite or matching slits. Each resilient body may therefore have a same torsion, or a torsion that matches up to 180°. If the resilient body is a web or rod, it may have thickened edges, for tailored stiffness maps, and if a web, may have a longitudinal fold, thinning, or bend to increase stiffness.

FIG. 1d shows how an array of the resilient bodies 30 may be distributed between each channel defined between beside members 25. While a uniform distribution of the resilient bodies 30 is shown, it will be appreciated that a density of the resilient bodies may vary, for example with a highest density furthest from couplings 28, and a lowest density nearest the couplings. Furthermore, web composition, thickness and width may also vary to achieve a similar coupling stiffness distribution along the members 25. While as shown each resilient body 30 is a web having a width less than that of the members 25 (centred thereon, see FIG. 1c), and a thickness less than that of the members 25 (extending from facing sidewalls 25a, see FIG. 1d), and a length far less than that of the members 25, none of these is strictly necessary, and each is preferable, except that the width of the web, if oriented perpendicular to the embodiment shown (see FIG. 6d), may be equal to the length of the members 25. FIG. 1d also shows that the bridging structure 20 may have a high aspect ratio in the collapsed pose in that the members may be many times longer than a minimum separation of beside members. As shown in FIG. 1a-c, only one resilient body 30 is in view in each channel, as all of the other resilient bodies in the set are occluded. Herein if the resilient body is a web of relatively uniform thickness and width, and the thickness is far less than the width, and the width at least marginally less than its length, (as shown in FIG. 1) it is referred to as a ribbon 30.

In the array shown in FIG. 1d, each of the resilient bodies 30 are ribbons anchored to facing sidewalls 25a of beside members 25. The resilient bodies 30 are paired, with hinges of the resilient bodies 30 facing in opposite directions. It will be appreciated that if all the resilient bodies are hinges facing a common direction, there is a tendency for the bridging structure to open slightly more along one edge than the other. Applicant currently prefers using opposite orientations of resilient bodies to cancel moments that deformation of the resilient bodies 30 individually entail, for symmetric translation of the bridging structure. The resilient bodies 30 are paired with oppositely oriented neighbors, to cancel moments that deformation of the resilient bodies 30 individually entail. This can also be addressed by a ribbon that has symmetric bending action, or by structures other than ribbons. For example if the roots of the ribbons shown in FIG. 1d were brought to an overlapping pose, each resilient body 30 would consist of anchoring segments to the sidewalls 25a coupling to a cylindrical hoop that provides symmetric deformation. Alternatively each channel may have oppositely oriented sinc-shaped ribbons, leading to a reduced net tendency of the bridging structure to exhibit differential stiffness at opposite ends during articulation.

As the ribbons are oriented with a width running widthwise of the members 25, centred on an axis of the couplings 28 (FIG. 1c), pivoting of the members 25 on this axis causes differential rates of extension of the ribbon at different distances from the axis. As such, a widening of the sheet 24 between two beside members 25 with an attendant pivot movement results in a sheet proximal edge of the resilient body 30 extending more, and sheet distal edge of the resilient body 30 contracting (if separation of the members' couplings 28 is not sufficient) or extending less. At some large angle of pivot, this differential spacing would lead to a kinking of the ribbon. A single ribbon 30 centred on the axis has advantages in terms of ease of manufacture, and the inherent resistances offered to pivoting of the members on their axes without introducing any additional structures, as a shear stiffness of the ribbon acts as a compliance in a second dimension, while also providing resilience between the members.

An alternative structure may use different resilient bodies 30 arrayed at different positions relative to the sheet 24 to provide different restorative forces at different spacings of the members and pivot angles. For example, two ribbons, one that meets the members between the coupling's axis and sheet and the other that meets the members between the axis and bottoms of the beside members, operate in opposition (one in compression and the other in extension), and a wire (or oppositely oriented ribbon: see FIG. 6d) in line with the axis tends to minimally influence pivot on the axis, while exerting control over spacing of the axes. Thus a combination of two or more ribbons/wires can be chosen to offer independent control over pivot resistance and translation resistance. One advantage of using two or more distinct, parallel resilient bodies is that each can have a respective rest separation. By setting these two rest separations apart, the resilient bodies will oppose each other over a range of positions and orientations of the members, which can reduce a force required for actuation, as well as a uniformity of the force throughout extension.

A variety of materials are known for the sheet, and Applicant's co-pending patent application WO 2018/209434 teaches one particular, suitable material with embedded, oriented, nanotubes, which allow for a large difference in stiffness between the oriented and opposite orientations (far more than 2 times). The sheet 24 preferably includes a matrix of a material with high elasticity 10-500% extension, and a Poisson's ratio above 0.20, preferably 0.25-0.6, more preferably from 0.27-0.5. A Young's modulus of the material may be below 3 MPa, more particularly from 500 KPa to 2 MPa. An elastomeric body (including amorphous polymers, vulcanisates, and thermoplastic elastomers) may be preferred for the composition of the sheet/matrix. To ensure cold temperature operation, a silicone or a synthetic rubber may be preferred.

As will be appreciated by those of skill in the art, a foil may be a large structural part, and may require a patchwork of bridging structures to produce a desired coverage. In a space between two bridging structures, a top surface of the guide rails 26 may offer a smooth, continuous support for the sheet 24, and there may be several to many parallel guide rails 26 for supporting different strips of the sheet 24, as there may be different pistons 18 and/or passive glide mechanisms at different rib sections of the foil 10.

SBS 20a is shown in FIG. 1a in a closed pose. The sheet 24 may be in a substantially flat arrangement (a difference less than of 5° in orientations of the members 25). From FIG. 1b, the open pose of SBS 20a is shown to produce a fluid dynamic surface 24a' that is curved. Guide rail 26a of SBS 20a is mounted only to body 15, and the only part of the SBS 20a connected to LES 12 is the sheet 24, and possibly a coupling resilience (perhaps identical to resilient bodies 30 but joining a non-facing surface of outside members 25 with the nose 12 or body 15), or stopper for the guide rail 26a that would limit extension of the nose 12, and avoid undue pressure on the coupling resilience.

While a substantial part of the fluid dynamic surface 24a' remains nearly flat (within 5°) in FIG. 1b, there is a single region of high curvature 31 (shown in FIG. 1a) that calls for substantial pivoting of the members 25 about an axis of their couplings 28. In the embodiment shown, a first member 25 is required to undergo pivoting movement of about 38° during translation across this region 31. A second member 25 pivots only about 19°. A third member 25 pivots by about 10°, and a fourth by about 8°. These four couplings 28 could have been the only ones mounted to the guide rails 26 by revolute joints, as avoiding revolute joints may allow for a more robust, durable, and lower-compliance system. FIGS. 1*a,b* show each coupling 28 as a same revolute joint adapted for sliding along the guide rails 26, as this provides a low friction slider.

PBS 20*b* is shown in FIG. 1*a* in a closed pose, and in FIG. 1*b* in an open pose. The PBS 20*b* has a guide rail 26*b* that is revolute-coupled to the foil body 15 by revolute joint 33, and by a translating revolute joint 34 to the LES 12. This allows for a separation of the LES 12 and foil body 15, while still permitting support for the LES 12, by allowing the guide rail 26*b* to take some off-axis forces applied between the LES 12 and the foil body 15. While a single point revolute joint 34 is shown as a simple, low friction mechanism, it will be appreciated that other guided carriages with similar degrees of freedom can alternatively be used. PBS 20*ab* may have no substantial curvature as shown and accordingly may not be a curved guide rail.

Figure 2A:
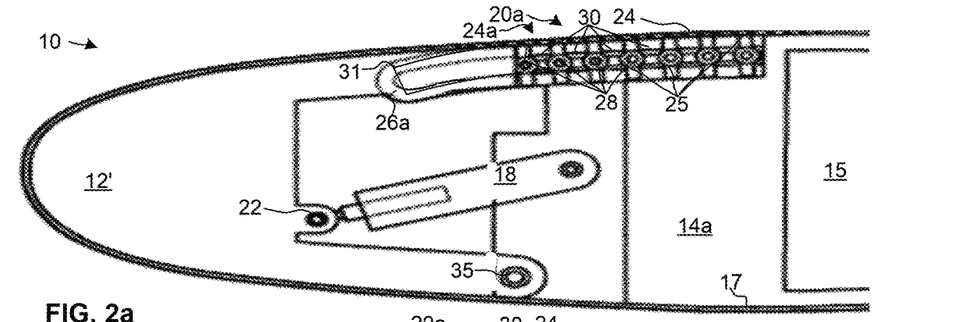
FIGS. 2a,b are cross-section side elevation views of a first variant of the deforming fluid-dynamic foil of FIG. 1 having a simplified actuation mechanism and only a suction-side articulated bridging structure.
Figure 2B:
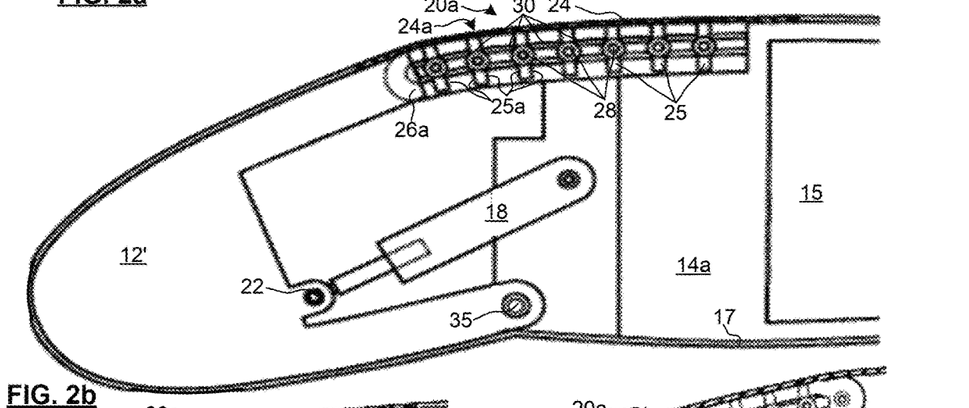

FIG. 2 are schematic illustrations of a variant of FIG. 1, but with a simplified design, that calls for only a suction-side bridging structure 20*a*, and a hinge-mounted pressure-side coupling between the LES 12' and foil body 15. A partial view of the foil 10 is presented to show the salient features of the bridging structure and LES 12'. Herein like reference numerals identify similar features, and their descriptions are not repeated, except to note differences. FIG. 2*a* shows the foil 10 in a closed, or low drag pose, having both low camber and chord. A simplified actuation linkage, in comparison with that of FIG. 1, is provided. The LES 12' is a longer nose than LES 12, and a bottom edge thereof meets the foil body 15 at joint 35, instead of via a PBS 20*b*. The joint 35 replaces the glide mechanism of the embodiment of FIG. 1. The guide rail 26*a* is now designed with a low curvature segment, and constant curvature segment 31, the curvature matching a radius from joint 35 axis. Various other linkage assemblies can be used to join foil bodies and LESs.

FIG. 3 is a schematic partial illustration of a deforming foil 10 variant having independent camber and chord extensions. As will be appreciated by those of ordinary skill, fixed wing aircraft design may advantageously use flight control surfaces during flight to stabilize, or redirect the aircraft. There is a substantial trade-off between agility and maneuverability and stability of aircraft, but for a cost penalty of a single actuator, the LES 12 can be operated with independent camber and chord, and can also offer a more responsive means for varying an angle of attack without substantially varying chord length, if desired. While large commercial, and passenger aircraft may not benefit from such a structure, higher agility aircraft, including UAVs and more acrobatic aircraft may.

FIG. 3 shows a variant of FIG. 1, with a 2 DoF actuation linkage, with a second piston 18*a* replacing the glide mechanism (hinge mounted glide arm 19, and roller supports 21). Each piston 18 is independently actuable, and jointly controlled to ensure that the LES 12 is in a desired pose. Away from fully extended, and fully contracted poses, the pistons 18 can be commanded to vary chord, by jointly extending or retracting the pistons 18, and to vary camber/angle of attack, by increasing/decreasing a difference in actuation lengths of the pistons 18,18*a*. Piston 18*a* is mounted by revolute joints to both the LES 12 and body 15, and translating revolute joints 34 are provided for coupling both guide rails 26*a,b* to the LES 12.

Figure 3A:
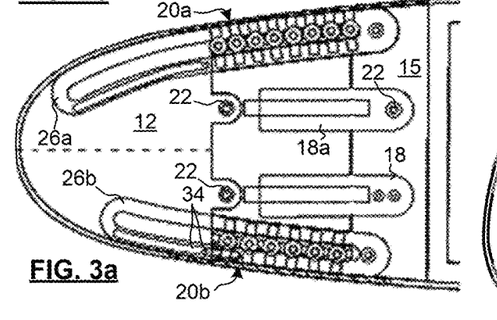
FIGS. 3a,b,c,d are cross-section side elevation views of a second variant deforming fluid-dynamic foil of FIG. 1 with two parallel actuators for independent control over both camber (and pitch) and chord, shown respectively in: closed, high camber low chord extension, high chord no camber extension, and an intermediate pose of high camber and intermediate chord.
Figure 3B:
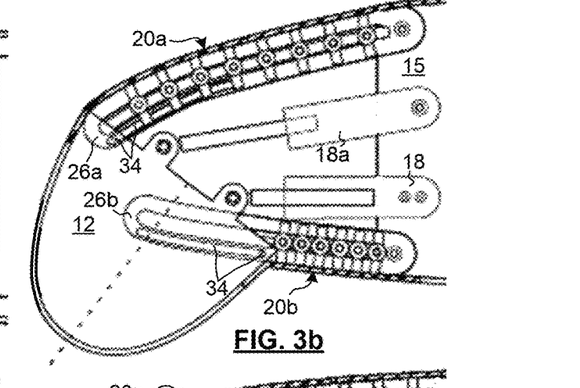
Figure 3C:
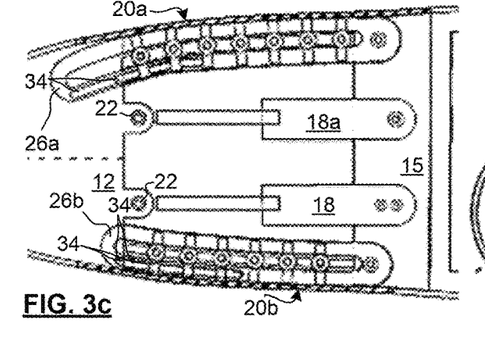
Figure 3D:
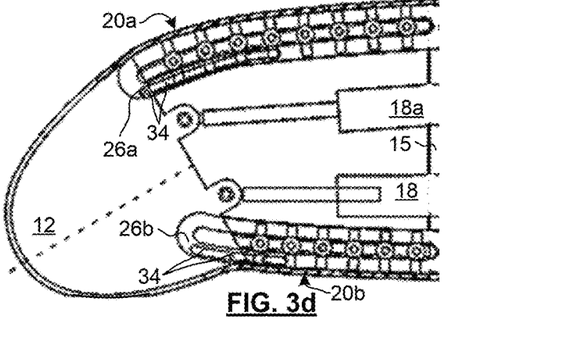

FIGS. 3*a,b,c,d* show the leading part of the foil in four poses, respectively: low chord with no camber increase (closed); highest camber (low chord); highest chord (low camber); and an intermediate pose with high camber. Equivalently these four poses can be understood as full retraction without tilt, highest retraction highest tilt; full extension no tilt, and a combination of retraction and tilt. The closed pose of FIG. 3*a* is not a pose of least extension of the bridging structure 20*b*, as is best seen in FIG. 3*b*. Rather, the least extension of the bridging structure 20*b* has a higher camber than the pose of FIG. 3*a*. A pose with highest extension of both bridging structures 20*a,b* has a tilt angle intermediate the poses of FIGS. 3*c* and *d*.

By modifying this example to provide symmetric guide rails 26*a,b*, the foil may be fully symmetric, allowing for both positive and negative extension to equal degrees. While it is a dubious advantage to invert camber in flight of a fixed wing aircraft, perhaps with the exception of a UAV intended for inverted flight, it may be highly advantageous in a reciprocating turbine to flip camber. For example, Applicant's U.S. Pat. No. 9,562,434 teaches a reciprocating turbine adapted for ground-effect improved energy harvesting from a flow. This patent teaches using a motor to tilt the foils throughout a reciprocation cycle. It would be advantageous to only tilt a leading or trailing edge segment to achieve the same camber and pitch variations and avoid rotating the foil about its moment.

Figure 4A:
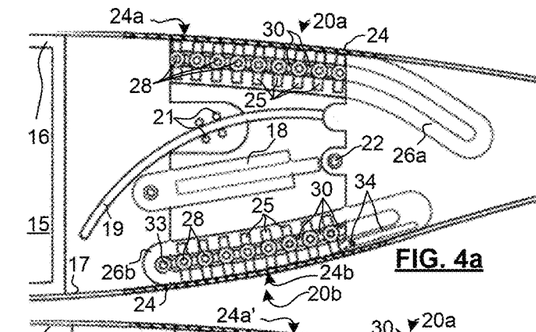
FIGS. 4a,b are cross-section side elevation views of a fluid-dynamic foil with a camber and chord varying trailing edge extension with suction and pressure articulated bridging structures, having a structural mapping to the foil of FIG. 1, respectively in closed and open poses.
Figure 4B:
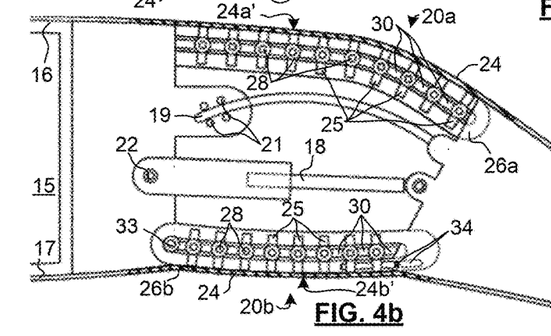

FIGS. 4*a,b* are schematic partial illustrations of a deforming foil 10' with a trailing edge segment TES 35 coupled to a foil body 15, in closed and highest camber, high extension poses. As in the embodiment of FIG. 1, the TES 35 is coupled to the body 15 by a piston 18 and glide mechanism (of like composition). Like FIG. 1, a first four members 25 of bridging structure 20*a* undergo substantial pivot (15-20°) during transit over a region of highest curvature, however bending of the guide rail 26*a* is more focused about a single bend between two sections of lower curvature. Bridging structure 20*b* has a more pronounced curvature, with members 25 arrayed in the open pose having an angular variation of over 5° and accordingly may form a curved fluid dynamic surface 24*b'*.

While camber and chord extending segments were shown hereinabove, it will be appreciated that span extension, height, bend radius, and/or cant angle of a wingtip (either folded down like the XB-70 Valkyrie, or with tips folded up for ground effect vehicles like the Lippisch X-114, or bent upwards like a wingtip device) can equally be provided, and requires an arcuate fluid-dynamic surface.

Figure 5A:
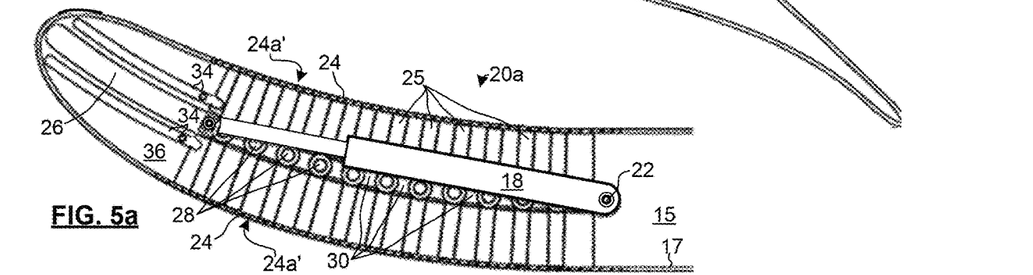
FIGS. 5a,b are, respectively in closed and open poses, cross-section side elevation views of a fluid-dynamic foil with span and cant varying wingtip extensions with an articulated bridging structure that extends between both suction and pressure sides, having a structural mapping to the foil of FIG. 1.

FIGS. 5*a,b* are schematic illustrations of a deforming foil with wingtip extension segment 36, in closed, and open poses, respectively. The image is a cross section perpendicular to fluid direction, to show the flexing direction which is now span-wise. It will be appreciated that one merit of a deforming fluid-dynamic foil with a leading edge segment (e.g. FIGS. 1-3) is that the rigid LES provides stability of the foil in a region subjected to highest amplitude fluid dynamic pressure variations (spatially and temporally). Advantageously a change in pose of the rigid LES in this high amplitude region can be leveraged to change airflow over the foil. The wingtip extension segment 36 may have a similar advantage in providing a stiff member resisting wingtip vortices. Substantially rigid members may be arranged for sliding reciprocation to stiffen a leading edge of the wingtip extension segment 36 (not in view).

Figures 5B, 6C, 6D:
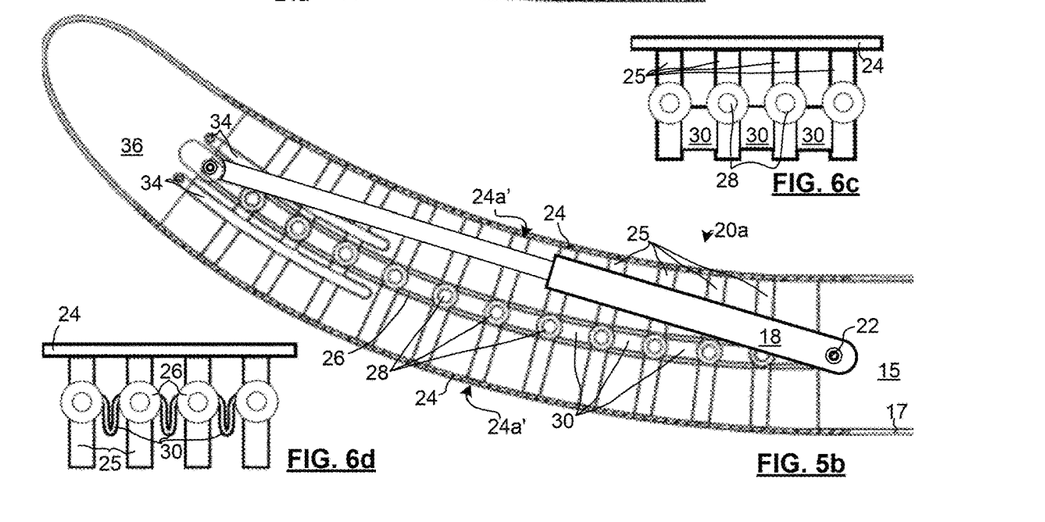

FIGS. 5*a,b* show substantially only the bridging structure 20*a*, and wingtip 36, with only a small part of the body 15 in view. The bridging structure 20*a* is similar to previous variants, with the exception that two sheets are shown, one on a top surface (24), and one on the bottom surface (24'), of members 25, and the members 25 run from the pressure side (bottom surface) all the way to the suction side (top section). In some embodiments, these two sheets may be ends of a single piece, that also defines a trailing edge by a shaped, part of piece. Thus the same bridging structure 20 provides fluid-dynamic surfaces 24a' on both sides of the foil. Furthermore the fluid-dynamic surfaces 24a' are substantially curved, to define a cant angle, bend radius, and height of the wingtip 36 in the closed, open, and all intermediate poses.

The actuator linkage includes a piston 18 revolute mounted to the wingtip 36 and to the body 15, and the guide rail 26 that is affixed to the body 15. The wingtip 36 has slots for engaging a pair of translating revolute joints 34 to guide prismatic movement of the wingtip 36. The translating revolute joints 34 are guided through the slots, while fixed with respect to a reciprocating end of the piston 18. While not shown, a shape of the piston 18 and guideways of the joints 34 may be bent to vary a sweep of the winglet 36 during extension, with the leading edge fabricated to accommodate the motion.

Distributed across drawing sheet 3 are side views of variants of the bridging structure 20 of FIGS. 1-5 without any guide rails 26 to avoid occlusions, shown as FIGS. 6a-d. While FIG. 1c shows couplings 28 and resilient bodies 30 extending from a middle of members 25, this is only one possibility. In each figure, only 4 members are shown, though it will be appreciated that there may be many more. Each variant is discussed in comparison with the embodiment of FIGS. 1c,d.

Figure 6A:
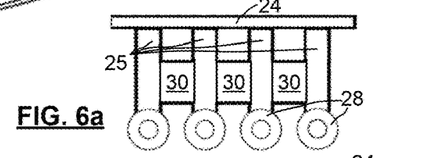

FIG. 6a shows a first variant of the bridging structure 20, in which the couplings 28 are provided distal the sheet 24. As a result of this change, a small angle of tilt about the central axis of the couplings 28 leads to a larger change in separation of the members where they meet the sheet 24, and consequently more of the strain is provided by the sheet 24 via the members 25. A second consequence is that the ribbon 30 lies entirely between the axis and sheet. Accordingly the ribbon's resilient force (whether in compression or extension) concertedly leads to a moment about the axis, with only a lesser effect produced by the separation of the sheet proximal and sheet distal edges.

Figure 6B:
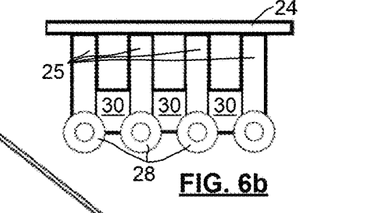

FIG. 6b shows a second variant of the bridging structure 20, in which the couplings 28 and ribbons 30 are provided distal the sheet 24. As the axis is in line with a sheet distal edge of the ribbon, the ribbon's resilient force leads to a moment about the axis, but with a more noticeable effect produced by the separation of the sheet proximal and sheet distal edges than in the first variant.

FIG. 6c shows the ribbon 30 generally in a sheet distal pose, and the couplings 28 axes centred on the members 25. As such the sheet proximal edge of the ribbons 30 are aligned with the axis, resulting in similar internal tension during tilting of the members 25 as in the second variant, but because the ribbon is distal the axis, it will effect a moment in the opposite direction for the same force.

While the foregoing variants all had the ribbons extending from facing side-walls 25a of the members, oriented so that a thickness of the ribbons is oriented with a length of the members, FIG. 6d schematically illustrates an embodiment wherein the widths of the ribbons 30 meet the facing sidewalls 25a longitudinally of the members. While this could provide for widths that extend a full length of the members 25, for example providing a thinner resilient body with equal stiffness, these may also be cut to reduce a stiffness of the resilient bodies 30, to make a staggered array of these elements as in the other variants, to tailor stiffness of the member couplings.

One advantage of the embodiment of FIG. 6d is that the members and ribbons 30 may be extruded from a single die. If the members and ribbons have similar material properties, this arrangement is particularly inviting for mass production, as long as a minimum thickness of the extruder agrees with the resilient properties sought. Mounting of the sheet 24 and couplings 28 to an extruded set of members with resilient bodies may be a cost effective production route.

The thickness of the ribbon 30, where it meets the members 25, is shown aligned with axes of the couplings 28. As a result, the restorative forces exerted by the ribbons will principally contribute to spacings of the members 25. As the spacings are increased, a small tilt angle is naturally produced by an opening of the ribbon. As mentioned previously, this can be avoided by providing equal curvatures on both sides of the axis, or can be leveraged to encourage the tilt angle as a function of extension of the bridging structure.

It will be appreciated that two or more ribbons can be laid at different distances from the sheet 24 (including on the bottoms of the facing members 25), and these may have different thicknesses, thickness variations, or material properties. A difference in stiffnesses of two corrugated sheet materials relative to the couplings may be helpful for controlling a resistance to pivoting, as well as controlling translational movement of the members 25.

In alternative embodiments, two or more actuators may be used, for example, to at least partially decouple camber and chord modification.

Example

Figure 7:
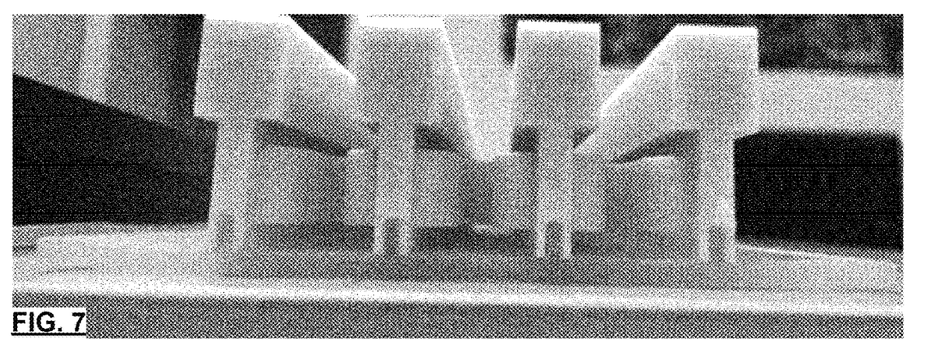
FIG. 7 is a photograph of a section of a bridging structure (only 4 members with 3 sets of resilient bodies) mounted to a sheet, where the bridging structure is sitting on a table with the sheet facing down, and the photograph is taken from an end view.

FIG. 7 is a side view of a 3-D printed bridging structure produced to test the present invention. The members 25 are substantially T shaped with an enlarged width at a bottom end thereof, and a small bifurcated tip for mounting to exposed ridges of an elastomeric sheet. The side view is of the sheet meeting a table on which it is resting.

The sheet was composed of E1040AL Urethane with 40 A Shore hardness. The ribbons and members were composed of LS Standard Nylon 12 GF with tensile modulus 2896 MPa-3585 MPa.

Figure 8:
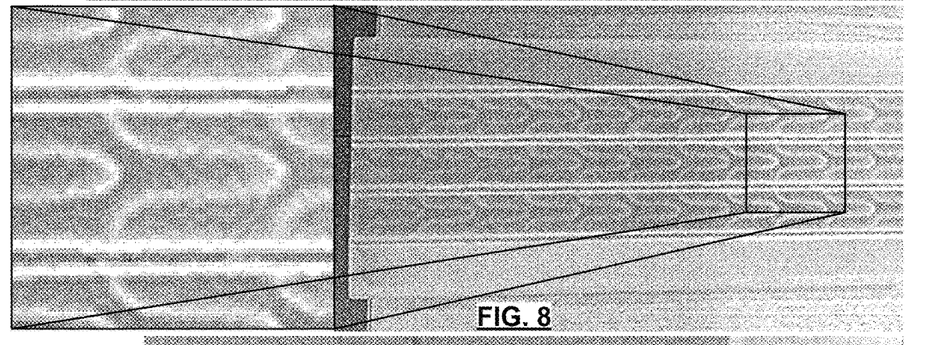
FIG. 8 is a photograph of the bridging structure of FIG. 7 in a top plan view, partially through the sheet, which is translucent, featuring an enlarged portion that clearly shows the resilient bodies, and where the members meet the sheet.

FIG. 8 shows the bridging structure from above. The ribbons are visible through the substantially transparent elastomeric sheet. To the left an enlargement is provided to facilitate view of the shapes of the resilient members, which are integrally formed with the members.

Figure 9A:
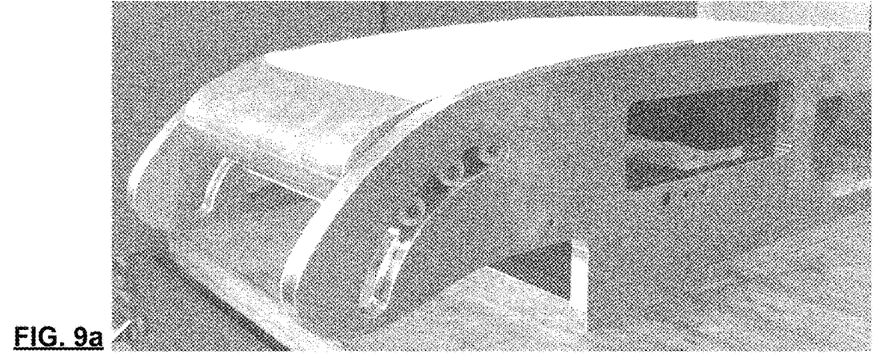
FIGS. 9a,b are photographs showing the bridging structure of FIG. 7 mounted to a rig, in contracted and extended poses.
Figure 9B:
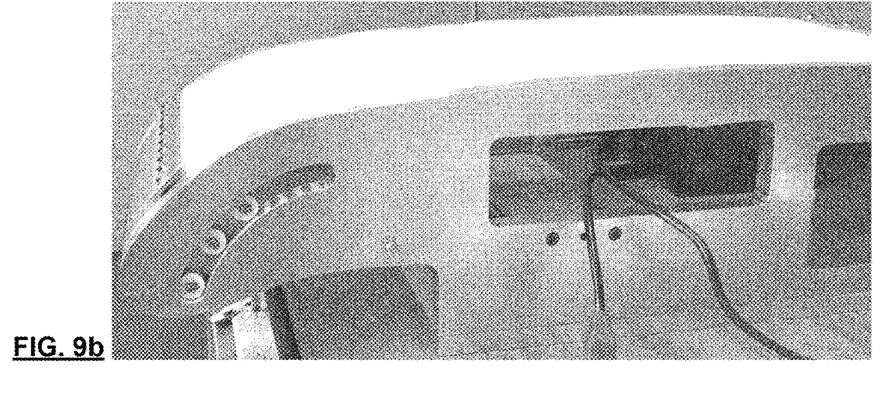

FIGS. 9a,b are images showing the bridging structure mounted to a test rig, in closed and opened poses. A rigid leading edge segment that corresponds to 12 in FIG. 1 is provided made of aluminum, and is attached to a leading edge of the bridging structure by a purpose-built clamp. Specifically two aluminum clamps were used to connect the bridging structure 20a to the rest of the setup. The use of clamps makes it easier to try different bridging structures made of different materials in the experimental demo.

The bridging structure is mounted to rails that are occluded by a support structure. A side plate and three bearings are provided on each side of the support structure, the side plate consisting of a slit in the support structure that provides a guide for the bearings that guide actuation, similar to the glide mechanism. These two components together guide the rigid leading edge segments on a path to reach the final deployed position. This mechanism is designed differently from its equivalent in FIG. 1 to make the implementation of the concept easier for a bench top model demonstration.

A linear actuator is not clearly in view. The actuator is the model LA36 product of Linak. The actuator offers max dynamic load of 4500 N, max stroke of 100 mm and it requires max current 20.7 Amp for full load. The actuator used 6.3 Amp (equivalent to 373 N) to push the bridging structure to the final deployed position.

Deviation Analysis

In order to evaluate the performance of the bridging structure, a deviation analysis is conducted in which the top skin of the bridging structure was laser-scanned to produce a profile, which is compared with an ideal profile at: closed and open poses, as well as three intermediate stations between the two. The measured profile at each station is obtained by averaging the laser-scanned profiles of the top skin over 5 deployment iterations.

The measurements were performed using the Go!SCAN 3D scanner made by CREAFORM company. The accuracy of this device is 0.05 mm. One common behavior of the skin, noticeable in all the plots, is its waviness. The skin follows a series of troughs and peaks associated with members along the chord. In the closed pose, the neighboring troughs or peaks are combined resulting in large areas of deviations, and in the fully open pose, more repetitive troughs and peaks with smaller amplitudes are observed. Note that in all these cases the deviation stays below the target deviation of 1 mm, but it is also worthwhile pointing out these deviations are obtained without the effect of aerodynamic loads. Aerodynamic loads are expected to amplify the peaks and mitigate the amplitudes of the troughs.

Otherwise, no conclusions were drawn from comparison of the deviation plots at different stations. As the wing is being deployed, some of the peaks disappear and the extent of some of the troughs expand, however the final fully open pose appears to have the smallest deviation from the ideal profile shape. Further exploration is required to fully explain the behavior of the skin.

The skin was bonded to the accordion elastic substructure while both components were in a neutral stress condition. Furthermore, the resulting bridging structure assembly was also installed while being in a neutral condition. The overall behavior of the skin during deployment suggests that slight pre-tensioning of the skin, either during the bonding process or during the installation of the bridging structure, might reduce the waviness, particularly in the case of the closed pose.

Non-symmetric distribution of the deviations was observed with respect to the midspan. These were attributed to inconsistencies in the manufacturing, assembly and operation of the skin panels. During the testing of the benchtop model, slight mismatch between movements of the roller bearings on the two sides of the members were observed. These resulted in misalignment of the members.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A bridging structure extensible to provide a curved fluid-dynamic suction or pressure surface for a deforming foil, the bridging structure comprising:
   a deformable sheet having an elastic elongation in a flexed direction of at least 5% of a length of the sheet in the flexed direction; a thickness having an elastic elongation less than ⅕th that of the flexed direction; and a second sheet direction perpendicular to the flexed direction;
   an array of at least four members running in a longitudinal direction, each member having: a top surface affixed to the elastomeric sheet in a direction perpendicular to the deforming direction; a pair of facing side-walls, each side-wall facing a sidewall of an adjacent member, except for outward facing side-walls of end members; a bottom surface opposite the top surface; and two ends;
   a set of resilient bodies interconnecting adjacent members, the resilient bodies deformable to extend spacings of the members in the deforming direction to increase an extent of the bridging structure in the flexed direction by at least 5% more than a closed pose of the bridging structure;
   a curved guide rail running perpendicular to the members; and
   a mounting mechanism for each member, coupling the member to the guide rail, the coupling permitting an angular pivot of at least 5° about an axis in the span direction during translation along the guide rail, for at least mounting mechanisms of members that cross a curved part of the guide rail.

2. A bridging structure of claim 1 wherein the resilient bodies join the facing side-walls.

3. The bridging structure of claim 1 wherein the resilient bodies are formed as sheets, ribbons, rods, or wires.

4. The bridging structure of claim 1 wherein the resilient bodies are ribbons that arrayed without torsion in that all local normals of the ribbons are confined to a plane, in a rest pose of the ribbon.

5. The bridging structure of claim 1 wherein the resilient bodies are webs, sheets, or ribbons meeting the members along the longitudinal direction.

6. The bridging structure of claim 1 wherein the second sheet direction has elastic percent elongation less than ⅕th that of the deforming direction.

7. The bridging structure of claim 1 wherein the deformable sheet comprises a matrix material, and the matrix material consists essentially of an elastomer.

8. The bridging structure of claim 1 wherein the mounting member and guide rail lie below a bottom surface of the sheet.

9. A deforming foil comprising:
   a rigid first foil segment with a fluid-dynamic curvature on an outer face defining part of a foil surface on an articulated part of the deforming foil;
   a rigid second foil segment providing a suction surface and a pressure surface for the deforming foil, that is mounted rigidly to a structure;
   a linkage coupling the first segment to the second segment, the linkage actuable to displace the first segment relative to the second segment between a closed pose, where the first and second segments are adjacent, and an open pose where first and second members are separated;
   a bridging structure extensible during linkage actuation to provide a curved fluid dynamic suction or pressure surface extending between the second and first segments continuous with foil surfaces of the first and second segments in all states of actuation between the closed and open poses, the bridging structure comprising:
- a deformable sheet having an elastic elongation in a deforming direction at least as great as extension of the bridging structure as required in the open pose;
- an array of at least four members running in a longitudinal direction, each member having:
  - a top surface bonded to the elastomeric sheet in a direction perpendicular to the deforming direction;
  - a pair of facing side-walls, each side-wall facing a sidewall of an adjacent member, except for outward facing side-walls of end members;
  - a bottom surface opposite the top surface; and
  - two ends;
- a set of resilient bodies interconnecting adjacent members, the resilient bodies adapted to extend a spacing of the members in the deforming direction to increase an extent of the bridging structure in the flexed direction by at least 5% more than a closed pose of the bridging structure;
- a curved guide rail running perpendicular to the members; and
- a mounting mechanism for each member, coupling the member to the guide rail, the coupling permitting an angular pivot of at least 5° about an axis in the span direction during translation along the guide rail, for at least mounting mechanisms of members that cross a curved part of the guide rail.

10. The deforming foil of claim 9 wherein the displacement of the first segment provides an increase in camber line length, and a change in chord length that is less than a 2.5% reduction, and the first segment is one of a leading and trailing edge segment.

11. The deforming foil of claim 9 wherein the displacement of the first segment provides an increase in span, or change in cant angle or bend radius of the deforming foil, and the first segment is a winglet.

12. The deforming foil of claim 9 wherein the displacement separates a geometric centre of the first segment from that of the second segment, by a length of at least 10% a length of the first segment.

13. The deforming foil of claim 9 wherein the displacement includes tilting the first segment about an axis oriented in the first direction by at least 15°.

14. The deforming foil of claim 9 wherein the curved guide rail is affixed at one end to one of the segments, and does not contact the other segment.

15. The deforming foil of claim 9 wherein the curved guide rail is affixed at opposite ends to the first and second segments by an articulation that allows for the movement of the first and second segments.

16. The deforming foil claim 9 wherein the guide rail has a top surface that extends below the sheet.

17. The deforming foil of claim 9 wherein the bridging structure includes a second deformable sheet, having similar properties as the deformable sheet bonded to the top surfaces of the members, but bonded to bottom surfaces of the members.

18. The deforming foil of claim 9 wherein the foil has a predominantly suction side and a predominantly pressure side opposite the predominantly suction side, and the only bridging structure is on the suction side of the foil.

19. The deforming foil of claim 18 further comprising a second bridging structure on a pressure side of the foil.

20. The deforming foil of claim 9 comprising two or more first foil segments with fluid-dynamic curvatures on outer faces thereof contributing to a foil surface on respective articulated parts of the deforming foil.

* * * * *